United States Patent [19]

Kadoriku et al.

[11] Patent Number: 4,938,682
[45] Date of Patent: Jul. 3, 1990

[54] TOGGLE TYPE MOLD CLAMPING APPARATUS IN AN INJECTION MOLDING MACHINE

[75] Inventors: Shinji Kadoriku, Sakai; Kikuo Watanabe, Oshino, both of Japan

[73] Assignee: Fanuc Ltd, Minamitsuru, Japan

[21] Appl. No.: 337,527
[22] PCT Filed: Nov. 15, 1988
[86] PCT No.: PCT/JP88/01154
 § 371 Date: Mar. 30, 1989
 § 102(e) Date: Mar. 30, 1989
[87] PCT Pub. No.: WO89/04753
 PCT Pub. Date: Jun. 1, 1989

[30] Foreign Application Priority Data

Nov. 20, 1987 [JP] Japan .................. 62-293569

[51] Int. Cl.[5] .................. B29C 45/66
[52] U.S. Cl. .................. 425/593; 425/451.6; 425/451.7; 425/595
[58] Field of Search .......... 425/451.5, 451.6, 451.7, 425/589, 592, 593, 595, DIG. 129

[56] References Cited

U.S. PATENT DOCUMENTS 4,273,524 6/1981 Smith .................. 425/589
4,285,384 8/1981 Wunder .................. 425/589
4,545,757 10/1985 Romi .................. 425/451.6
4,642,044 2/1987 Ishikawa .................. 425/451.6

FOREIGN PATENT DOCUMENTS 264220 12/1985 Japan.
233217 10/1987 Japan.

Primary Examiner—Jay H. Woo
Assistant Examiner—Timothy W. Heitbrink
Attorney, Agent, or Firm—Staas & Halsey

[57] ABSTRACT

A mold clamping apparatus of an injection molding machine is provided, which is capable of uniformly applying a pressing force to a movable platen. A pair of annular wedge type connection members (21, 22) are disposed within annular hollow portions (16a) of driving pulleys (16), which are respectively fitted on ball screws (14, 15) threadedly engaged with heads of upper and lower toggle sections disposed symmetrically with respect to an axis of the mold clamping apparatus. To make an adjustment for eliminating mismatch between operational phases of the toggle sections of the toggle mechanism due to flexure of the same mechanism, an urged contact state of the connection member is released by loosening bolts (23), and the ball screws, rendered to be rotatable relative to the driving pulleys, are manually rotated so that the heads are aligned with each other. After completion of the adjustment, the driving pulleys are again rendered rotatable in unison with the ball screws. The heads then are moved through the ball screws toward the movable platen, and links of the toggle sections for generation of the pressing force are gradually expanded. Since the operational phases of the toggle sections are matched to each other, the toggle mechanism applies a uniform pressing force onto the movable platen.

8 Claims, 1 Drawing Sheet

TOGGLE TYPE MOLD CLAMPING APPARATUS IN AN INJECTION MOLDING MACHINE

TECHNICAL FIELD

The present invention relates to a mold clamping apparatus for use in an injection molding machine, and more particularly to a mold clamping apparatus having a toggle mechanism of the double toggle link type, which is capable of uniformly applying a pressing force onto a movable platen.

BACKGROUND ART

Typically, a toggle type mold clamping apparatus which is mounted on an injection molding machine comprises a double toggle link type toggle mechanism having a pair of toggle sections (toggle links) which are disposed between a rear platen and a movable platen of the injection molding machine and which are symmetric with each other with respect to an axis of the clamping apparatus in the vertical direction. The toggle sections are coupled to each other by means of a crosshead which is threadedly engaged with a ball screw disposed on the axis of the mold clamping apparatus. The mold clamping apparatus is arranged so that, as the crosshead is moved toward the movable platen along the ball screw with rotation of the ball screw, two links of each of the toggle sections for generating a pressing force gradually expand to be switched from a state in which these links are bent to another state in which the links are stretched to establish a straight line relationship therebetween, so as to apply a pressing force onto the movable platen. With a mold clamping apparatus of the kind having a pair of toggle sections which are disposed symmetrically, it is possible to apply the pressing force generated by the toggle mechanism to the movable platen uniformly over the entire surface of the movable platen to a considerable extent. However, since primary parts of the mold clamping apparatus such as the ball screw, crosshead, etc., are disposed and concentrated on the axis of the clamping apparatus, flexure of the toggle mechanism is liable to occur, resulting in poor uniformity of the pressing force applied to the movable platen. Moreover, when flexure of the ball screw occurs due to the weight of the ball screw and the weight of the crosshead and the like, forces resulting from this flexure are exerted on the upper and lower toggle sections, which are separated from each other in the vertical direction of the clamping apparatus, in opposite directions from each other with respect to operational phases of these toggle sections. In this connection, the pressing force applied to the movable platen lacks uniformity. Consequently, parallelism between the rear platen and the movable platen deteriorates, as does the parallelism between the movable platen and the front platen. Accordingly, a guide pin disposed between mold halves respectively mounted on these platens is liable to be damaged, when a mold is employed.

DISCLOSURE OF THE INVENTION

The object of the present invention is to provide a mold clamping apparatus for use in an injection molding machine, which is capable of suppressing generation of flexure of a toggle mechanism, and of compensating for ununiformity of a pressing force applied to a movable platen resulting from flexure of the toggle mechanism.

To achieve the above-mentioned object, according to the present invention, a mold clamping apparatus for use in an injection molding machine having a movable platen disposed for reciprocal motion between a front platen and a rear platen, includes a first ball screw disposed in facing relation with a peripheral edge portion of the rear platen and extending in parallel with an axis of the mold clamping apparatus; a second ball screw disposed in facing relation with a peripheral edge portion of the rear platen and at a side opposite the first ball screw with respect to the axis of the mold clamping apparatus and extending in parallel with the same axis; a first toggle section disposed inwardly of the first ball screw and having a head which is threadedly engaged with the first ball screw, and a plurality of links; a second toggle section disposed inwardly of the second ball screw and having a head which is threadedly engaged with the second ball screw, and a plurality of links; a first driving pulley for driving the first ball screw; a second driving pulley for driving the second ball screw; a first connection means selectively assuming one of the first state for causing the first ball screw to be rotatable in unison with the first driving pulley and a second state for causing the first ball screw to be rotatable relative to the first driving pulley; and a second connection means selectively assuming one of a first state for causing the second ball screw to be rotatable in unison with the second driving pulley and a second state for causing the second ball screw to be rotatable relative to the second driving pulley.

As mentioned above, according to the mold clamping apparatus of the present invention, the ball screws and the heads respectively associated with the pair of toggle sections are disposed at the sides of peripheral edge portions of the rear platen. Accordingly, the primary parts of the toggle mechanism are located so as not to be concentrated on the axis of the mold clamping apparatus, so that the generation of flexure of the toggle mechanism is suppressed. Moreover, each of the ball screws is rotatable relative to the driving pulley for driving the ball screw. Thus, the operational phase of the pair of toggle sections are adjustable independently from each other with ease. In consequence, when a flexure of the toggle mechanism is produced, an adjustment is performed so that the pressing force from the toggle mechanism is applied to the movable platen uniformly over the entire surface thereof. As a result, the parallelism between the movable platen and the front platen maintained so that a guide pin in the mold is prevented from being damaged.

BEST MODE OF CARRYING OUT THE INVENTION

Figure 1:
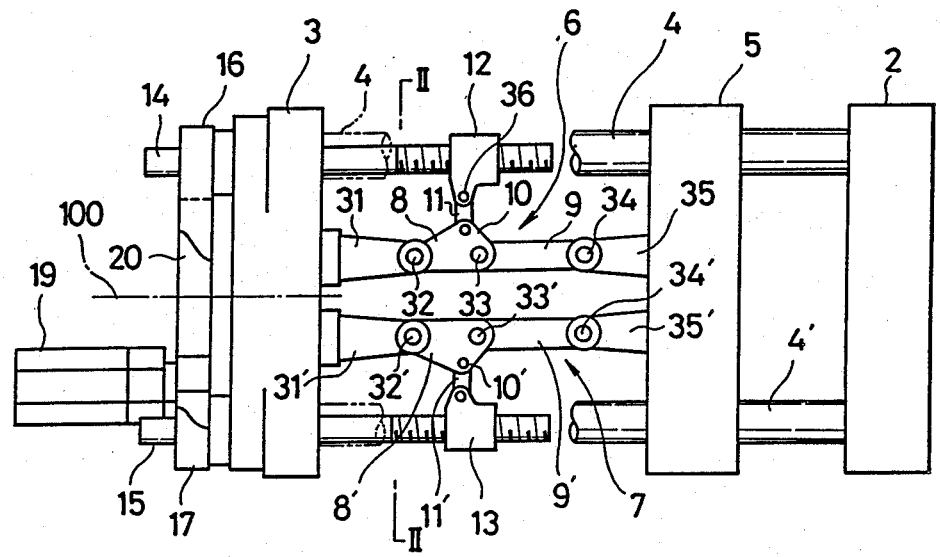
FIG. 1 is a schematic front view showing a mold clamping apparatus according to an embodiment of the present invention.

Referring to FIG. 1, in an injection molding machine which is equipped with a mold clamping apparatus according to an embodiment of the present invention, a movable platen 5 is disposed for reciprocal motion between a front platen 2 and a rear platen 3 along a pair of upper tie bars 4 and a pair of lower tie bars 4', the platens 2, 3 being connected with each other by means of the tie bars 4, 4'.

Figure 2:
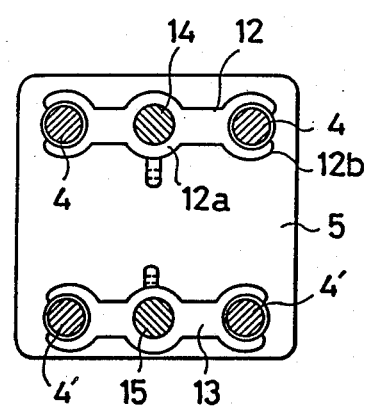
FIG. 2 is a view showing the heads of a toggle mechanism, as viewed from line II—II in FIG. 1.

The mold clamping apparatus 1 comprises upper and lower ball screws 14 and 15, which extend in parallel with an axis 100 of the mold clamping apparatus 1 and axially movably pass through upper and lower edge portions of the rear platen 3, respectively, and a toggle mechanism which connects the rear platen 3 with the movable platen 5. As shown in FIG. 2, the ball screws 14, 15 are disposed, respectively between the pair of upper tie bars 4 and between the pair of lower tie bars 4', and extend in parallel with the upper and lower tie bars. The toggle mechanism, which is of the double toggle link type, comprises an upper toggle section 6 and a lower toggle section 7, both of which are the same in construction and are disposed symmetrically with respect to the axis 100.

The upper toggle section 6 has an upper head 12 (FIG. 2), which has a central portion formed with a ball nut 12a threadedly engaged with a screw portion which is formed over half of the upper ball screw 14 and opposite end portions slidably receiving the tie bars 4. Further, the section 6 has first, second and third links 8, 9 and 11. The first link 8 has one end pivotally connected through a pin 32 with a tip end of a support member 31 which projects from a central portion of an end face of the rear platen 3 at the side facing the toggle mechanism, and another end pivotally connected through a pin 33 with an end of the second link 9. Another end of the second link 9 is pivotally connected through a pin 34 with a tip end of a support member 35 which projects from a central portion of the movable platen 5 at the side facing the toggle mechanism. Further, an intermediate portion of the first link 8 is pivotally connected through a pin 10 with an end of the third link 11 which has another end pivotally connected through a pin 36 with the head 12. As mentioned above, the lower toggle section 7 is the same in construction as the upper toggle section 6, and comprises elements 13, 8'-11' and 32'-34' which respectively correspond to the elements 12, 8-11 and 32-34 of the upper toggle section 6. Reference numerals 31' and 35' of FIG. 1 respectively show elements corresponding to the elements 31 and 35.

Figure 3:
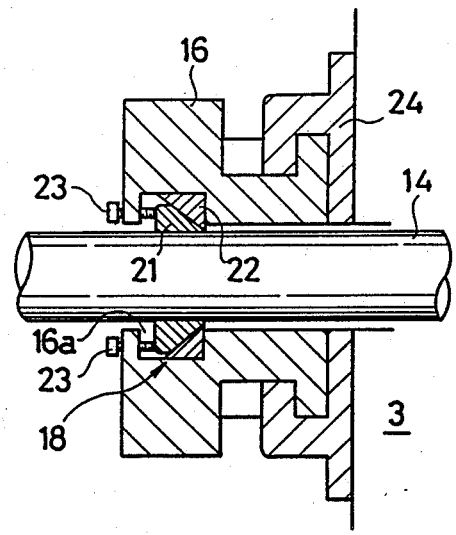
FIG. 3 is an enlarged fragmentary sectional view showing a driving pulley and wedge type connection members in a state wherein the driving pulley is rotatable in unison with a ball screw.

Disposed on the rear end surface of the rear platen 3 at the side remote from the toggle mechanism are driving pulleys 16 and 17 through which shaft portions of the ball screws 14, 15 loosely pass and which are arranged to drive these screws, respectively, the pulleys being operatively coupled through a timing belt 20 to the output shaft of a motor 19 for mold clamping which is mounted on the rearend surface of the rear platen 3 at the side remote from the toggle mechanism. As shown in FIG. 3, the driving pulley 16 is supported by the rear platen 3 in a manner rotatable but immovable in the axial direction, through a dished support member 24 which is fitted on a stepped portion of the pulley 16 formed at the side facing the rear platen and accommodating therein a bearing, not shown. An end portion and an end surface of the driving pulley 16 at the side remote from the rear platen are formed with an annular hollow portion 16a and a plurality of screw holes (not shown), respectively. Disposed within the annular hollow portion 16a is a first connection means 18 which comprises a pair of wedge type connection members 21, 22 fitted on the shaft portion of the ball screw 14 and a plurality of bolts 23 which are threadedly engaged with the screw holes, respectively. The connection members 21, 22 are formed into an annular ring which is triangular in cross section. The driving pulley 16 is so arranged as to be rotatable in unison with the ball screw 14 when the connection members 21, 22 are brought into contact with each other at their opposite slanted surfaces by tightening the bolts 23, with the outer peripheral surface and the end surface of the connection member 22 in contact with the inner peripheral surface of the hollow portion of the driving pulley 16 and with the inner peripheral surface of the connection member 21 in contact with the outer peripheral surface of the ball screw 14. The driving pulley 16 is rendered to be rotatable relative to the ball screw 14 when the urged contact state of the connection members is released by loosening the bolts 23. Although not shown, the driving pulley 17 is also rotatably supported by the rear platen 3 through an element corresponding to the support member 24, and is also arranged to be rotatable in unison with the ball screw 15 when a second connection means having elements corresponding to the connection members 21, 22 are brought into urged contact with each other and to be rotatable relative to the ball screw when such urged contact state is released, as with the driving pulley 16.

In the following, the operation of the mold clamping apparatus constructed as mentioned above will be explained.

First, mold halves (not shown) are mounted on the front platen 2 and the movable platen 5, respectively. Then, in order to apply a uniform pressing force onto the movable platen 5 during mold closing and mold clamping operations, an adjustment is carried out for eliminating a mismatch between operational phases of the toggle sections 6, 7 of the toggle mechanism due to flexure of the same mechanism. To this end, the bolts 23 are loosened so as to remove the urged contact state of the pair of connection members 21, 22 so that the ball screw 14 is rotatable relative to the driving pulley 16. Therefore, this operation can be effected with the timing belt 20 kept mounted on the driving pulleys 16, 17. The same operation is carried out for the driving pulley 17 so that the ball screw 15 is rendered to be rotatable relative to the driving pulley 17. Next, the ball screws 14 and 15 are manually rotated so that the respective positions of the heads 12, 13 of the toggle sections 6 and 7 on the ball screws are in alignment with each other. Consequently, a bend angle formed between the first and second links 8, 9 of the upper toggle section 6 becomes equal to an angle formed between the similar links of the lower toggle section.

After completion of adjustment of the operational phases of the toggle sections in the above manner, the bolts 23 are tightened so that the connection members 21, 22 are brought into urged contact with each other and hence the driving pulley 16 is rendered to be rotatable in unison with the ball screw 14. A similar operation is carried out for the driving pulley 17. Next, the motor 19 for mold clamping is started. Upon start of the motor, the driving pulleys 16, 17 coupled to the motor through the timing belt 20 and the ball screws 14, 15 which are now connected through the connection means (one of which is shown by reference numeral 18) to the pulleys in a manner rotatable in unison therewith, respectively, are rotated. With rotation of the ball screws, the heads 12, 13 and the third links 11, 11' of the upper and lower toggle sections 6, 7 coupled to these heads are moved toward the movable platen 5. As the third links of these toggle sections are moved toward the movable platen 5, the first and second links 8, 9; 8', 9', which have been bent at their associated pins 33, 33' until that time, gradually expand so as to cause the movable platen 5 to move toward the front platen 2, so that the movable platen 5 reaches its mold touch position. Since the operational phases of the toggle sections 6, 7 are matched, the toggle mechanism comprised of the toggle sections 6, 7 applies a pressing force to the movable platen 5 uniformly over the entire surface at the side of the toggle mechanism while the movable platen 5 is further moved from its mold touch position toward the front platen 2. Upon receipt of the pressing force, the movable platen 5 is moved to reach its mold clamping position at which the first and second links of the toggle sections 6, 7 establish their straight line relationship shown in FIG. 1 so that the tie bars 4, 4' are extended to produce a desired mold clamping force. Thereafter, upon completion of cooling of molten resin which is injected into the mold by means of an injection mechanism, not shown, of the injection molding machine, the motor 19 is rotated in a reverse direction so as to perform mold opening operation. In the meantime, the above-mentioned operational phase and adjustment can be carried out, where required, with the operation of the injection molding machine stopped.

Although the driving pulleys 16, 17 are driven by the common motor 19 in the above-mentioned embodiment, these pulleys may be driven by the use of motors independently mounted. Further, it may be possible to mount pressing force detectors each comprised of a load cell, for instance, on the toggle section so that the operation of the injection molding machine is stopped and instructions to notify of the necessity of operational phase adjustment for the toggle sections are provided when a considerable difference is found between outputs from these detectors indicative of pressing forces generated by the toggle sections.

We claim:

1. A mold clamping apparatus for use in an injection molding machine, said mold clamping apparatus having a movable platen disposed for reciprocal motion between a front platen and a rear platen, said mold clamping apparatus comprising:
   a first ball screw disposed in a first peripheral edge portion of said rear platen and extending in parallel with a longitudinal axis of said mold clamping apparatus;
   a second ball screw disposed in a second peripheral edge portion of said rear platen and at a side opposite said first ball screw with respect to said longitudinal axis of said mold clamping apparatus and extending in parallel with said longitudinal axis;
   a first toggle section disposed inwardly of said first ball screw, said first toggle section having a first head which is threadedly engaged with said first ball screw, said first toggle section further having a first set of links, said first set of links being connected to said rear platen, said first head and said movable platen;
   a second toggle section disposed inwardly of said second ball screw, said second toggle section having a second head which is threadedly engaged with said second ball screw, said second toggle section further having a second set of links, said second set of links being connected to said rear platen, said second head and said movable platen;
   a first driving pulley for driving said first ball screw;
   a second driving pulley for driving said second ball screw;
   a first connection means capable of selectively assuming a first state for causing said first ball screw to be rotated in unison with said first driving pulley and a second state for causing the first ball screw to be rotatable relative to said first driving pulley; and
   a second connection means capable of selectively assuming a third state for causing the second ball screw to be rotated in unison with said second driving pulley and a fourth state for causing said second ball screw to be rotatable relative to said second driving pulley.

2. A mold clamping apparatus according to claim 1, wherein each of said first and second toggle sections includes a first link having first and second ends, said first end being pivotally supported by said rear platen; a second link having opposite ends pivotally supported by said second end of said first link and said movable platen, respectively, and a third link having opposite ends pivotally supported by an intermediate portion of said first link and said head, respectively.

3. A mold clamping apparatus according to claim 1, wherein each of said first and second connection means comprises a pair of ring-shaped connection members having opposed slanted surfaces at which the connection members are urged into contact with each other, and an urging member for causing said connection members to be brought into contact with each other, a first one of said pair of connection members having a peripheral surface which is urged into contact with a corresponding one of said first and second driving pulleys, and a second one of said pair of connection members having an inner peripheral surface which is urged into contact with a peripheral surface of a corresponding one of said first and second ball screws, said pair of connection members causing said corresponding driving pulley to be rotatable in unison with said corresponding ball screw when said pair of connection members are brought into contact with each other by means of said urging member.

4. A mold clamping apparatus according to claim 1 wherein said first and second toggle sections are disposed symmetrically with respect to said axis.

5. A mold clamping apparatus according to claim 1, wherein said first and second toggle sections are separated from each other in a vertical direction.

6. A molding clamping apparatus according to claim 2, wherein each of said first and second connection means comprises a pair of ring-shaped connection members having opposed slanted surfaces at which the connection members are urged into contact with each other, and an urging member for causing said connection members to be brought into contact with each other, a first one of said pair of connection members having a peripheral surface which is urged into contact with a corresponding one of said first and second driving pulleys, and a second one of said pair of connection members having an inner peripheral surface which is urged into contact with a peripheral surface of a corresponding one of said first and second ball screws, said pair of connection members causing said corresponding driving pulley to be rotatable in unison with said corresponding ball screw when said pair of connection members are brought into contact with each other by means of said urging member.

7. A mold clamping apparatus according to claim 2, wherein said first and second toggle sections are disposed symmetrically with respect to said axis.

8. A mold clamping apparatus according to claim 2, wherein said first and second toggle sections are separated from each other in a vertical direction.

* * * * *

UNITED STATES PATENT AND TRADEMARK OFFICE
CERTIFICATE OF CORRECTION

PATENT NO. : 4,938,682
DATED : July 3, 1990
INVENTOR(S) : SHINJI KADORIKU and KIKUO WATANABE It is certified that error appears in the above-identified patent and that said Letters Patent is hereby corrected as shown below:

Col. 2, line 40, "phase" should be --phases--;
      line 47, "platen main-" should be --platen is main- --.

Col. 3, line 11, "respectively" should be --respectively,--;
      line 52, "rearend" should be --rear end--.

Col. 5, line 23, "phase and adjustment" should be --phase adjustment--.

Col. 6, line 38, "1" should be --1,--;
      line 44, "molding" should be --mold--.

Signed and Sealed this

Eighteenth Day of June, 1991

*Attest:*

*Attesting Officer*

HARRY F. MANBECK, JR.
*Commissioner of Patents and Trademarks*